United States Patent
Smith

(10) Patent No.: US 9,611,828 B2
(45) Date of Patent: Apr. 4, 2017

(54) WATER TURBINE

(71) Applicant: Murray Smith, Beaverlodge (CA)

(72) Inventor: Murray Smith, Beaverlodge (CA)

(*) Notice: Subject to any disclaimer, the term of this patent is extended or adjusted under 35 U.S.C. 154(b) by 400 days.

(21) Appl. No.: 14/059,973

(22) Filed: Oct. 22, 2013

(65) Prior Publication Data

US 2014/0044522 A1 Feb. 13, 2014

Related U.S. Application Data

(63) Continuation-in-part of application No. PCT/CA2012/050259, filed on Apr. 23, 2012.

(30) Foreign Application Priority Data

Apr. 26, 2011 (CA) ...................................... 2738399

(51) Int. Cl.
| | |
|---|---|
| *F03B 3/14* | (2006.01) |
| *F03B 3/12* | (2006.01) |
| *F03B 17/06* | (2006.01) |

(52) U.S. Cl.
CPC ............ *F03B 3/126* (2013.01); *F03B 17/065* (2013.01); *Y02E 10/28* (2013.01); *Y02E 10/38* (2013.01)

(58) Field of Classification Search
CPC .... F03B 17/062; F03B 17/067; F03B 17/065; F03B 17/06; F03B 13/10; F03D 3/067; F03D 3/068; F03D 3/002; F03D 3/061; F03D 3/06; F03D 3/005
USPC . 416/119, 117, 40, 41, 98, 110, 111, 118, 9, 416/17
See application file for complete search history.

(56) References Cited

U.S. PATENT DOCUMENTS

| | | | |
|---|---|---|---|
| 113,284 A | 4/1871 | Folsom | |
| 1,484,980 A | 2/1924 | Zottoli | |
| 3,976,396 A * | 8/1976 | Antogini | ................. F03D 3/067 415/141 |
| 5,051,059 A | 9/1991 | Rademacher | |
| 7,378,750 B2 | 5/2008 | Williams | |
| 7,442,002 B2 | 10/2008 | Mondl | |
| 7,737,570 B2 | 6/2010 | Costin | |
| 7,902,687 B2 | 3/2011 | Sauer et al. | |

(Continued)

FOREIGN PATENT DOCUMENTS

| | | | |
|---|---|---|---|
| BE | 894552 A2 | 1/1983 | |
| DE | 3526342 A1 * | 1/1987 | ............. F03D 3/067 |

(Continued)

OTHER PUBLICATIONS

DE 38 16 555 A1 Machine Translation. Accessed EPO Website Jan. 18, 2016. 5 Pages.*

*Primary Examiner* — Richard Edgar
(74) *Attorney, Agent, or Firm* — Davis & Bujold PLLC; Michael J. Bujold

(57) ABSTRACT

A water turbine includes a base and an axle extending upwardly relative to the base. A body is provided having an axle receiving bore positioned along a longitudinal rotational axis. The axle is positioned in the axle receiving bore, such that the body rotates about the longitudinal rotational axis. A weight bearing roller assembly is positioned between a lower end of the body and the base to facilitate the body rotating relative to the base. Vanes extend radially from the body, such that flowing water striking the vanes imparts a rotational force to the body.

3 Claims, 3 Drawing Sheets

(56) References Cited

U.S. PATENT DOCUMENTS

| | | |
|---|---|---|
| 7,918,646 B2 | 4/2011 | Akcasu |
| 2008/0159873 A1 | 7/2008 | Tran |
| 2009/0016882 A1 | 1/2009 | Robinson |

FOREIGN PATENT DOCUMENTS

| | | | | |
|---|---|---|---|---|
| DE | 3816555 A1 | * | 11/1989 | ............ F03B 17/065 |
| FR | 2844837 A1 | * | 3/2004 | ............ F03D 3/062 |
| GB | 118899 A | * | 9/1918 | ............ F03B 17/063 |
| JP | H1149091 A | | 2/1999 | |

* cited by examiner

WATER TURBINE

FIELD

There is described a water turbine which is rotated by flowing water.

BACKGROUND

Flowing water has long been recognized as a potential source of energy. Recent examples include U.S. Pat. No. 7,442,002 (Mondl) entitled "Tidal Turbine Installation"; U.S. Pat. No. 7,902,687 (Sauer et al) entitled "Submersible Turbine Generation Unit for Ocean and Tidal Currents"; U.S. Pat. No. 7,737,570 (Costin) "Water Turbine System and Method of Operation"; U.S. Pat. No. 7,378,750 (Williams) entitled "Tidal Flow Hydroelectric Turbine" and U.S. Pat. No. 7,918,646 (Akcasu) entitled "High Efficiency Turbine With Variable Attack Angle Foils". What is required is an alternative configuration of water turbine that can be more readily deployed in flowing water.

SUMMARY

There is provided a water turbine, which includes a base and an axle extending upwardly relative to the base. A body is provided having an axle receiving bore positioned along a longitudinal rotational axis. The body is preferably cylindrical in shape, however it will be understood that the body may be other shapes. The axle is positioned in the axle receiving bore, such that the cylindrical body rotates about the longitudinal rotational axis. A weight bearing roller assembly is positioned between a lower end of the cylindrical body and the base to facilitate the cylindrical body rotating relative to the base. Vanes extend radially from the cylindrical body, such that flowing water striking the vanes imparts a rotational force to the cylindrical body.

The water turbine, described above, can readily be deployed in flowing water by merely lowering the water turbine until the base rests upon a river bed or ocean bed. This is in contrast to many prior water turbines that have elaborate flotation and anchoring assemblies.

If the water turbine has fixed angle vanes, a certain amount of rotational resistance is provided by the vanes that are moving into, as opposed to with, the flowing stream. Even more beneficial results may, therefore, be obtained when each of the vanes have a proximate end and a distal end. The proximate end of each of the vanes being pivotally mounted to the cylindrical body with the vanes being pivotally movable between an operative position extending outwardly from the cylindrical body and an inoperative position resting against the cylindrical body. With this configuration, the vanes collapse to the inoperative position when moving into the flowing water. It is preferred that the vanes are curved to match a radius of curvature of the cylindrical body. This ensures that the vanes will rest against the cylindrical body providing minimal resistance when in the inoperative position.

Although beneficial results may be obtained through the use of the water turbine, as described above, it is preferred that the timing of the movement of the vanes not be left entirely to an interaction with the flowing water. A delay in movement to the operative position or the inoperative position of one or more of the vanes may result in undesirable inefficiencies. Even more beneficial results may, therefore, be obtained when a linkage is provided between pairs of vanes. Upon movement of one vanes of each pair of vanes to the operative position, another of the vanes of each pair of vanes is drawn by the linkage to the inoperative position. It will be appreciated that there are various ways of configuring the linkage. In the description which follows both a mechanical linkage and a hydraulic linkage have been illustrated and described.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
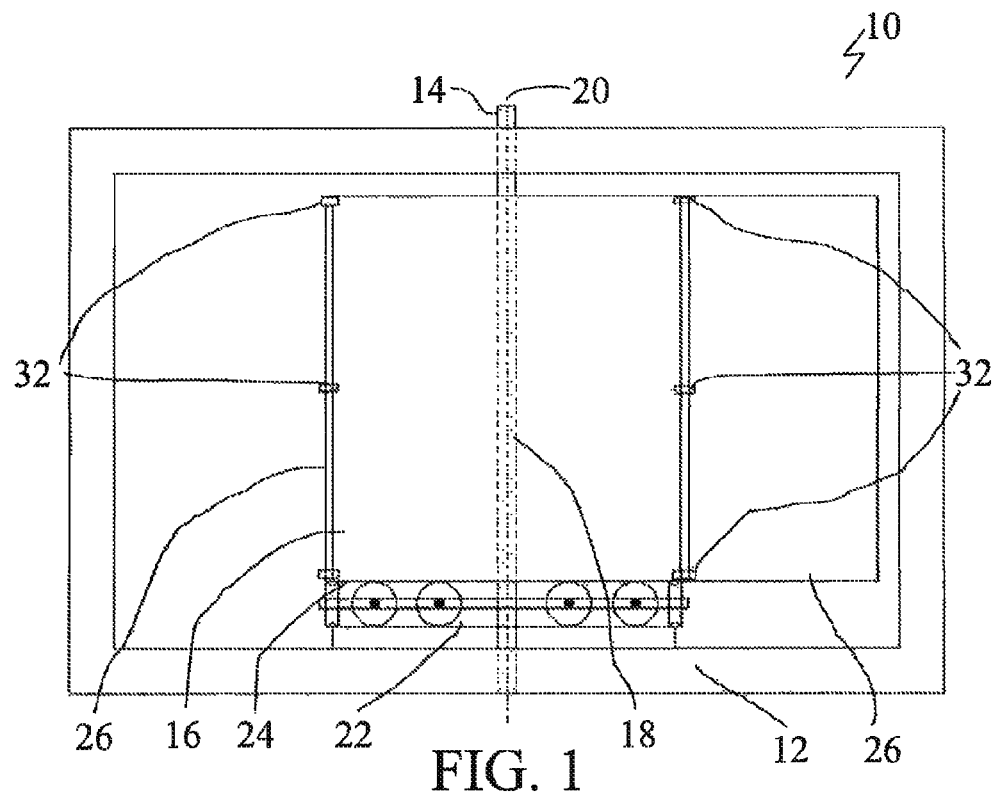
FIG. 1 is a side elevation view, partially in section, of a water turbine

A water turbine generally identified by reference numeral 10, will now be described with reference to FIG. 1 through 6.

Figure 2:
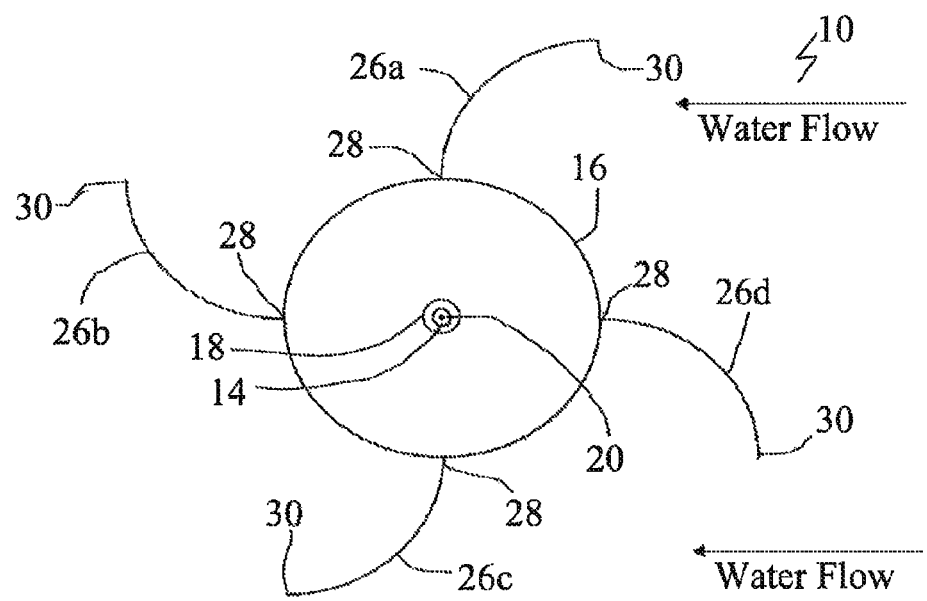
FIG. 2 is a top plan view of the water turbine shown in FIG. 1 with fixed vanes.

Structure and Relationship of Parts:

Referring to FIG. 1, a water turbine 10 includes a base 12 with an axle 14 extending upwardly relative to base 12 and a body 16 which has an axle receiving bore 18. In the embodiments shown, body 16 is preferably cylindrical in shape, however it will be understood that body 16 may be other shapes. Axle receiving bore 18 is positioned along a longitudinal rotational axis 20 such that when axle 14 is positioned in axle receiving bore 18 cylindrical body 16 rotates about longitudinal rotation axis 20. A weight bearing roller assembly 22 is positioned between a lower end 24 of cylindrical body 16 and base 12 to facilitate rotation of cylindrical body 16 relative to base 12. Vanes 26 are connected to cylindrical body 16. Referring to FIG. 2, vanes 26a, 26b, 26c and 26d extend radially from cylindrical body 16, such that flowing water striking vanes 26a, 26b, 26c and 26d imparts a rotational three to cylindrical body 16.

Figure 3:
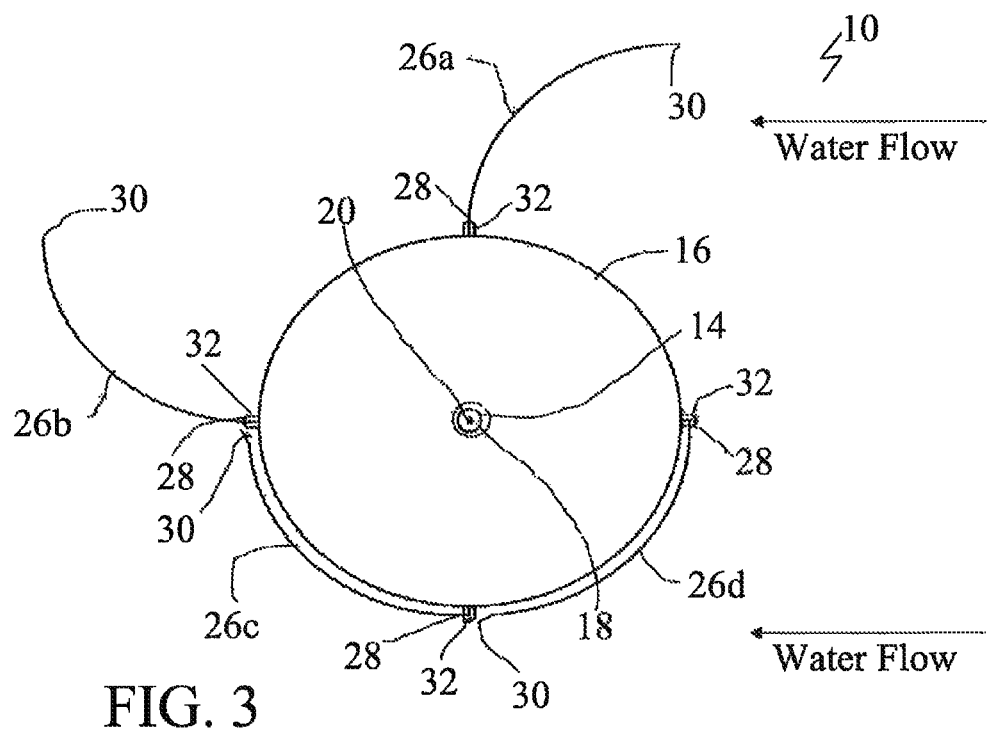
FIG. 3 is a top plan view of the water turbine shown in FIG. 1 with freely pivoting vanes in the operating position.
Figure 4:
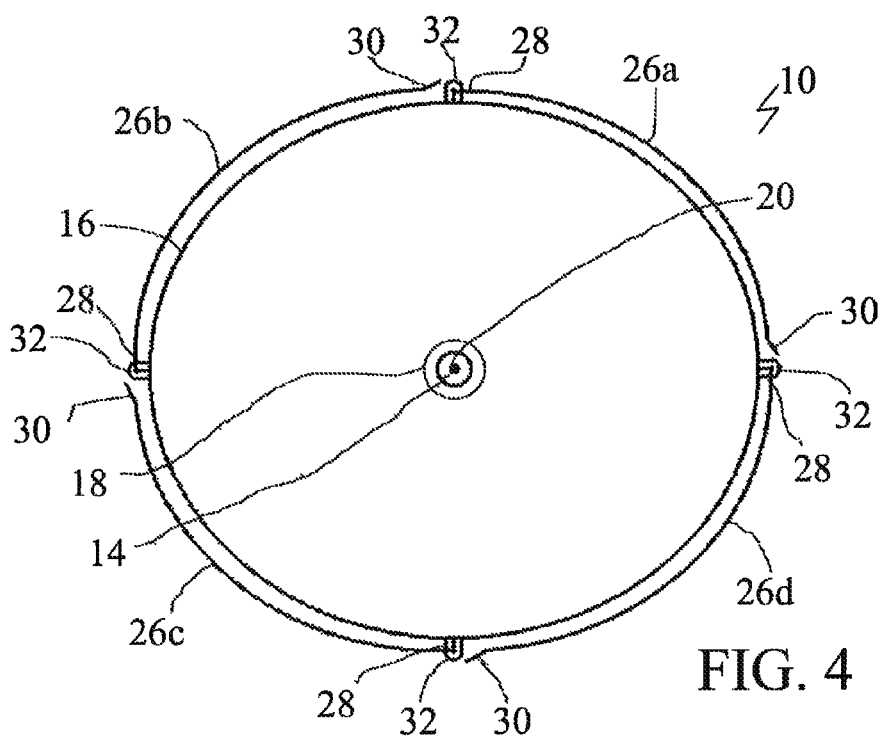
FIG. 4 is a top plan view of the water turbine shown in FIG. 1 with freely pivoting vanes in the inoperative position.
Figure 5:
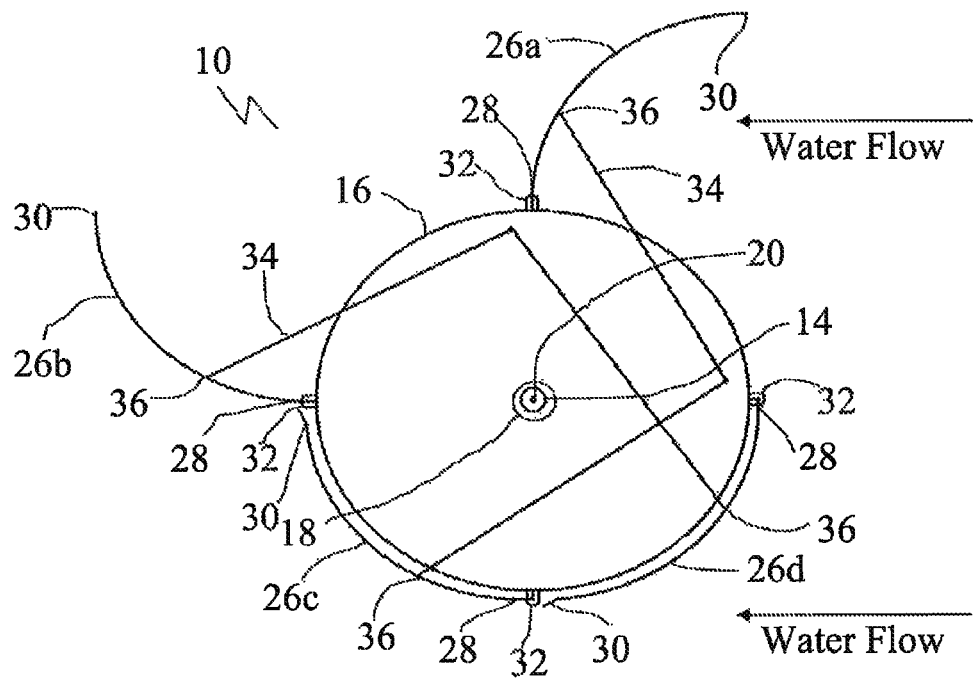
FIG. 5 is a top plan view of a mechanical linkage between vanes.
Figure 6:
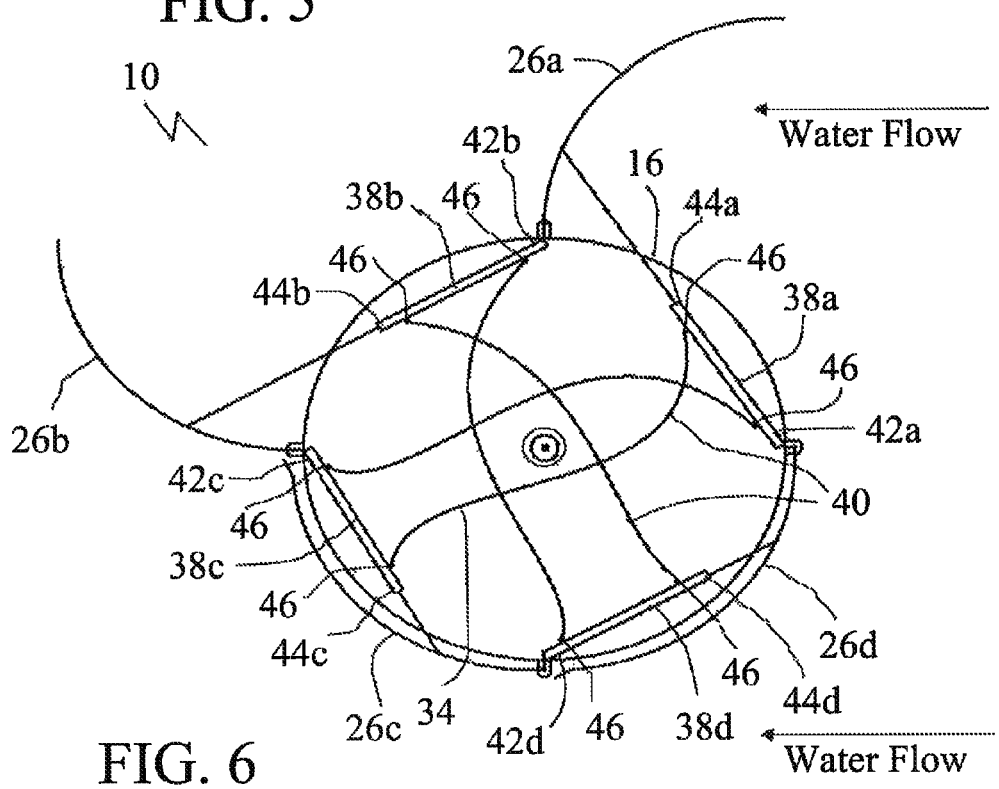
FIG. 6 is a top plan view of a hydraulic linkage between vanes.

Referring to FIG. 3 and FIG. 4, each of vanes 26a, 26b, 26c and 26d may have a proximate end 28 and a distal end 30. Proximate end 28 of vanes 26a, 26b, 26c and 26d is pivotally mounted to cylindrical body 16 by hinges 32 or other substitutable pivot attachments. Vanes 26a, 26b, 26c and 26d are pivotally movable between an operative position, shown in FIG. 3, extending outwardly from cylindrical body 16 and an inoperative position, shown in FIG. 4, resting against cylindrical body 16. Each of vanes 26a, 26b, 26c and 26d may be curved to match a radius of curvature of cylindrical body 16 so that vanes 26a, 26b, 26c and 26d will rest against cylindrical body 16 providing minimal resistance when in the inoperative position. Referring to FIG. 5 and FIG. 6, a linkage 34 may be provided between pairs of vanes 26a and 26c and vanes 26b and 26d which causes movement of one vane 26a or 26b within the pair to the operative position to draw second vane 26c or 26d within the pair to the inoperative position and vice versa. This linkage 34 may be either mechanical or hydraulic in nature.

Referring to FIG. 5, a simple mechanical linkage 34 is shown as an example. Each vane 26a, 26b, 26c and 26d is attached to a linkage 34 at a pivot point 36 and each linkage connects vanes 26a and 26c and vanes 26b and 26d into pairs. In the embodiment shown, the linkage forms a right angle between pivot points 36 of vanes 26a and 26c and vanes 26b and 26d. The linkage is positioned within cylindrical body 16.

Referring to FIG. 6, a hydraulic linkage 34 is shown as an example. Each individual vanes 26a, 26b, 26c and 26d has a hydraulic cylinder 38a, 38b, 38c and 38d connected to it that moves vanes 26a, 26b, 26c and 26d between an operative and an inoperative position. Hydraulic cylinders 38a, 38b, 38c and 38d are positioned within cylindrical body 16. Hydraulic cylinders 38a and 38c and hydraulic cylinders 38b and 38d are linked together using a series of pipes 40. Pipes 40 link hydraulic cylinder 38a to hydraulic cylinder 38c such that a connection 46 at a first end 42a of hydraulic cylinder 38a connects to a connection 46 at a second end 44c of hydraulic cylinder 38c and a connection 46 at second end 44a of hydraulic cylinder 38a connects to a connection 46 at first end 42c of hydraulic cylinder 38c. Pipes 40 connects hydraulic cylinder 38b to hydraulic cylinder 38d such that a connection 46 at a first end 42b of hydraulic cylinder 38b connects to a connection 46 at a second end 44d of hydraulic cylinder 38d and a connection 46 at second end 44b of hydraulic cylinder 38b connects to a connection 46 at first end 42d of hydraulic cylinder 38d.

Operation:

Referring to FIG. 2, water turbine 10 is lowered into flowing water until base 12 contacts the river bed or ocean bed. Flowing water striking vanes 26a, 26b, 26c and 26d imparts a rotational force to cylindrical body 16, causing cylindrical body 16 to rotate about longitudinal rotation axis 20 on weight bearing roller assembly 22. With fixed angle vanes 26a, 26b, 26c and 26d, a certain amount of rotational resistance is provided by vanes 26a, 26b, 26c or 26d that are moving into, as opposed to with, the flowing stream.

Referring to FIG. 4, water turbine 10 is lowered into flowing water until base 12 contacts the river bed or ocean bed in the inoperable position. This allows water turbine 10 to be placed in position with limited rotational movement of cylindrical body 16. In the inoperable position, all of vanes 26a, 26b, 26c and 26d are pivoted to rest against cylindrical body 16 providing minimal resistance and minimal movement of water turbine 10. Referring to FIG. 3, vanes 26a, 26b, 26c and 26d may be moved into the operable position which causes cylindrical body 16 to rotate about longitudinal axis 20 on weight bearing roller assembly 22. Vanes 26a, 26b, 26c and 26d are pivotally mounted to cylindrical body 16 by hinges 32 which allows vanes 26a, 26b, 26c and 26d to collapse to the inoperative position when moving into the flowing water. This limits the amount of rotational resistance seen when vanes 26a, 26b, 26c and 26d are fixed.

Referring to FIG. 5, a mechanical linkage 34 may be provided between pairs of vanes 26a and 26c and vanes 26b and 26d to prevent a delay in movement to the operative position or the inoperative position that can result in inefficiencies rotational movement of cylindrical body 16. Vanes 26a and 26c have a pivot point 36 that are linked together by linkage 34. When vane 26a is in the operative position, vane 26c is pulled to the inoperative position. When vane 26c catches the flow of water and moves into the operative position, it pulls vane 26a to the inoperative position. Vanes 26b and 26d are linked in the same manner, such that movement of one vane into the operative position causes the other vane to move into the inoperative position.

Referring to FIG. 6, a hydraulic linkage 34 may be provided between pair of vanes 26a and 26c and vanes 26b and 26d. Each vane 26a, 26b, 26c and 26d is connected to a hydraulic cylinder 38a, 38b, 38c and 38d, respectively, that move the vanes 26a, 26b, 26c and 26d into the operative and inoperative positions. Hydraulic cylinders 38a and 38c and hydraulic cylinders 38b and 38d are linked together by pipes 40. The linkage is such that when hydraulic cylinder 38a extends vane 26a to the operative position, hydraulic cylinder 38c causes vane 26c to collapse into the inoperative position and when hydraulic cylinder 38a collapses vane 26a to the inoperable position, hydraulic cylinder 38c extends vane 26c to the operative position. Hydraulic cylinders 38b and 38d are linked in the same manner, such that when one hydraulic cylinder extends its corresponding vane into the operative position the other hydraulic cylinder collapses its corresponding vane into the inoperable position.

Cautionary Notes:

Some information was learned during the building and testing of proto-types that is worthy of note and may help persons skilled in the art ensure a successful outcome without experimentation. Cylindrical body 16 will have a tendency to float to at least some extent. One will want to determine what the optimum preload should be placed on roller assembly 22 and add sufficient ballast to cylindrical body 16 to preload roller assembly 22. It is preferred that vanes 26 be made "floatable" to reduce stress and wear on bushings as the wings move. If vanes 26 are made hollow water ballast may be placed into vanes 26 to adjust their floatation properties. Without this aspect "scale up" may be difficult, as the larger the size of vanes 26 the greater the force acting on the bushings.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given the broadest interpretation consistent with the description as a whole.

What is claimed is:

1. A water turbine comprising:
   a base;
   an axle extending upwardly relative to the base;
   a body having an axle receiving bore positioned along a longitudinal rotational axis, and the axle being positioned in the axle receiving bore such that the body rotates about the longitudinal rotational axis;
   a weight bearing roller assembly positioned directly between a lower end of the body and the base to facilitate the body rotating relative to the base, and the weight bearing roller assembly bearing the weight of the body; and
   vanes extending radially from the body, such that flowing water striking the vanes imparts a rotational force to the body;
   wherein each of the vanes has a proximate end and a distal end, the proximate end of the vanes is pivotally mounted to the body with the vanes being pivotally movable between an operative position, extending outwardly from the body, and an inoperative position, resting against the body; and a hydraulic linkage is connected between pairs of vanes on opposed sides of the body, and, upon movement of one vane, of each pair of vanes, to the operative position, another of the vanes, of each pair of vanes, is drawn to the inoperative position by a hydraulic force applied by the linkage.

2. The water turbine of claim 1, wherein the body is cylindrical.

3. The water turbine of claim 1, wherein each of the vanes is curved to match a radius of curvature of the body.

* * * * *